United States Patent
Nichols et al.

(10) Patent No.: US 9,529,093 B2
(45) Date of Patent: Dec. 27, 2016

(54) SYSTEMS AND METHODS FOR ESTIMATING ATTITUDE USING DOUBLE DIFFERENCED GPS CARRIER PHASE MEASUREMENTS

(71) Applicant: Google Inc., Mountain View, CA (US)

(72) Inventors: Jonathan Nichols, San Francisco, CA (US); James Brian Roseborough, Piedmont, CA (US); Craig Lewin Robinson, Palo Alto, CA (US); Hamid Mokhtarzadeh, Maple Grove, MN (US)

(73) Assignee: Google Inc., Mountain View, CA (US)

( * ) Notice: Subject to any disclaimer, the term of this patent is extended or adjusted under 35 U.S.C. 154(b) by 635 days.

(21) Appl. No.: 14/054,396

(22) Filed: Oct. 15, 2013

(65) Prior Publication Data

US 2015/0168562 A1 Jun. 18, 2015

Related U.S. Application Data

(60) Provisional application No. 61/713,126, filed on Oct. 12, 2012.

(51) Int. Cl.
*G01S 19/54* (2010.01)
*G01S 19/53* (2010.01)

(52) U.S. Cl.
CPC ..................................... *G01S 19/54* (2013.01)

(58) Field of Classification Search
USPC .............. 342/357.26, 357.36, 357.37, 357.4; 701/468, 469
See application file for complete search history.

(56) References Cited

U.S. PATENT DOCUMENTS

| | | | |
|---|---|---|---|
| 5,548,293 A * | 8/1996 | Cohen | G01S 5/0009 342/352 |
| 2003/0078705 A1* | 4/2003 | Kumar | G01S 19/36 701/13 |
| 2007/0075896 A1* | 4/2007 | Whitehead | G01S 19/53 342/357.36 |

OTHER PUBLICATIONS

Blewitt, "Basics of the GPS Technique: Observation Equations", Geodetic Applications of GPS, 1997, pp. 10-54.
Garcia et al., "Use of GPS Carrier Phase Double Differences", Latin American Applied Research, vol. 35, No. 2, 2005, pp. 115-120.

(Continued)

*Primary Examiner* — Dao Phan
(74) *Attorney, Agent, or Firm* — Dority & Manning, P.A.

(57) ABSTRACT

Systems and methods for estimating attitude using double differenced GPS carrier phase measurements are provided. An exemplary computer-implemented method includes obtaining, by one or more computing devices, an initial candidate attitude. The method includes determining, by the one or more computing devices, a plurality of expected double differenced carrier phase values based on the initial candidate attitude. The method includes inputting, by the one or more computing devices, the plurality of expected double differenced carrier phase values into a cost function. The cost function respectively compares the plurality of expected double differenced carrier phase values to a plurality of measured double differenced carrier phase values. The method includes minimizing, by the one or more computing devices, the cost function. The method includes selecting, by the one or more computing devices, a final candidate attitude associated with the minimized cost function as the attitude of the device.

14 Claims, 6 Drawing Sheets

(56) References Cited

OTHER PUBLICATIONS

Hide et al., "Adaptive Kalman Filtering for Low-cost INS/GPS", The Journal of Navigation, vol. 56, 2003, pp. 143-152.
Lachapelle et al., "Mathematical Models and GNSS Interference", GNSS Solutions, Mar./Apr. 2008, pp. 22-27.
Zheng, "Methods for Enhancing Carrier Phase GNSS Positioning and Attitude Determination Performance".

\* cited by examiner

SYSTEMS AND METHODS FOR ESTIMATING ATTITUDE USING DOUBLE DIFFERENCED GPS CARRIER PHASE MEASUREMENTS

PRIORITY CLAIM

The present application claims the benefit of priority of U.S. Provisional Patent Application Ser. No. 61/713,126, titled System and Method for Estimating Attitude Using Double Differenced GPS Carrier Phase Measurements, filed Oct. 12, 2012, which is incorporated herein by reference for all purposes.

FIELD

The present disclosure relates generally to systems and methods for estimating an attitude of a device using GPS signals. More particularly, the present disclosure relates to systems and methods for estimating the attitude of a device by minimizing over a set of candidate attitudes a cost function comparing expected double differenced carrier phase values to measured double differenced carrier phase values.

BACKGROUND

In many situations it is helpful to know both the position and orientation, or attitude, of a device, such as a vehicle. GPS positioning is a common method of calculating position which uses signals received from GPS satellites. In particular, GPS positioning can be performed by measuring the time it takes a signal to travel from a GPS satellite to a GPS receiver and then converting that time into a distance. Calculating the distance from the receiver to several GPS satellites measured at the same time can then produce an estimated position.

GPS satellites can use carrier signals to broadcast their communication messages to Earth. A carrier signal is a signal onto which a satellite encodes the communication message. As a receiver receives a signal, it can measure a carrier phase measurement. The carrier phase measurement can equal the difference between the phase of a receiver-generated signal at the time of reception and the phase of the carrier signal generated by the satellite at the time of transmission.

Because of the ability to accurately measure the carrier phase signal, carrier phase measurements can prove to be helpful in accurately determining range. However, because there is no absolute time information in the carrier phase measurement, it only provides range information to within a constant but unknown integer number of carrier phase cycles. As such, an unknown integer number of carrier signal cycles have occurred prior to the cycle in which the phase is being measured. This unknown integer number causes the carrier phase measurement to be ambiguous and is known as integer ambiguity.

Double differencing is one technique that may be applied to carrier phase measurements. Double differenced carrier phase measurement can be used to determine the relative position of a first receiver with respect to a second receiver. In particular, first single differenced carrier phase measurements can be created by differencing carrier phase measurements for each satellite mutually observed by two GPS receivers. Likewise, second differencing can be accomplished by selecting a reference satellite, and subtracting its single differenced result from all other single differenced satellite carrier phase measurements.

Differencing the first and second single differenced carrier phase measurements can provide a double differenced carrier phase measurement. Using double differenced carrier phase measurements can eliminate errors which are common to both receivers or both satellites, such as clock errors and, in the case that the two receivers are relatively close to one another, atmospheric errors. In particular, the first difference removes satellite errors and the second difference removes receiver errors.

Double differenced carrier phase measurements can also prove useful in relative positioning problems, such as estimating the attitude of a device based upon the relative positions of two receivers. However, double differenced carrier phase measurements still suffer from integer ambiguity. Existing methods for estimating attitude attempt to resolve integer ambiguity within the integer domain. However, resolving integer ambiguity within the integer domain is difficult, requiring large amounts of time, computing power, or other resources. As such, a method for estimating attitude which works entirely within the attitude domain is desired.

SUMMARY

Aspects and advantages of the present disclosure will be set forth in part in the following description, or may be obvious from the description, or may be learned through practice of embodiments of the present disclosure.

One exemplary aspect is directed to a computer-implemented method of estimating an attitude of a device. The method includes obtaining, by one or more computing devices, an initial candidate attitude. The method includes determining, by the one or more computing devices, a plurality of expected double differenced carrier phase values based on the initial candidate attitude. The method includes inputting, by the one or more computing devices, the plurality of expected double differenced carrier phase values into a cost function. The cost function respectively compares the plurality of expected double differenced carrier phase values to a plurality of measured double differenced carrier phase values. The method includes minimizing, by the one or more computing devices, the cost function. The method includes selecting, by the one or more computing devices, a final candidate attitude associated with the minimized cost function as the attitude of the device.

Other exemplary implementations are directed to systems, apparatus, non-transitory computer-readable media, and computing devices for estimating attitude using double differenced carrier phase measurements.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure directed to one of ordinary skill in the art, is set forth in the specification, which makes reference to the appended figures, in which.

DETAILED DESCRIPTION

Figure 1:
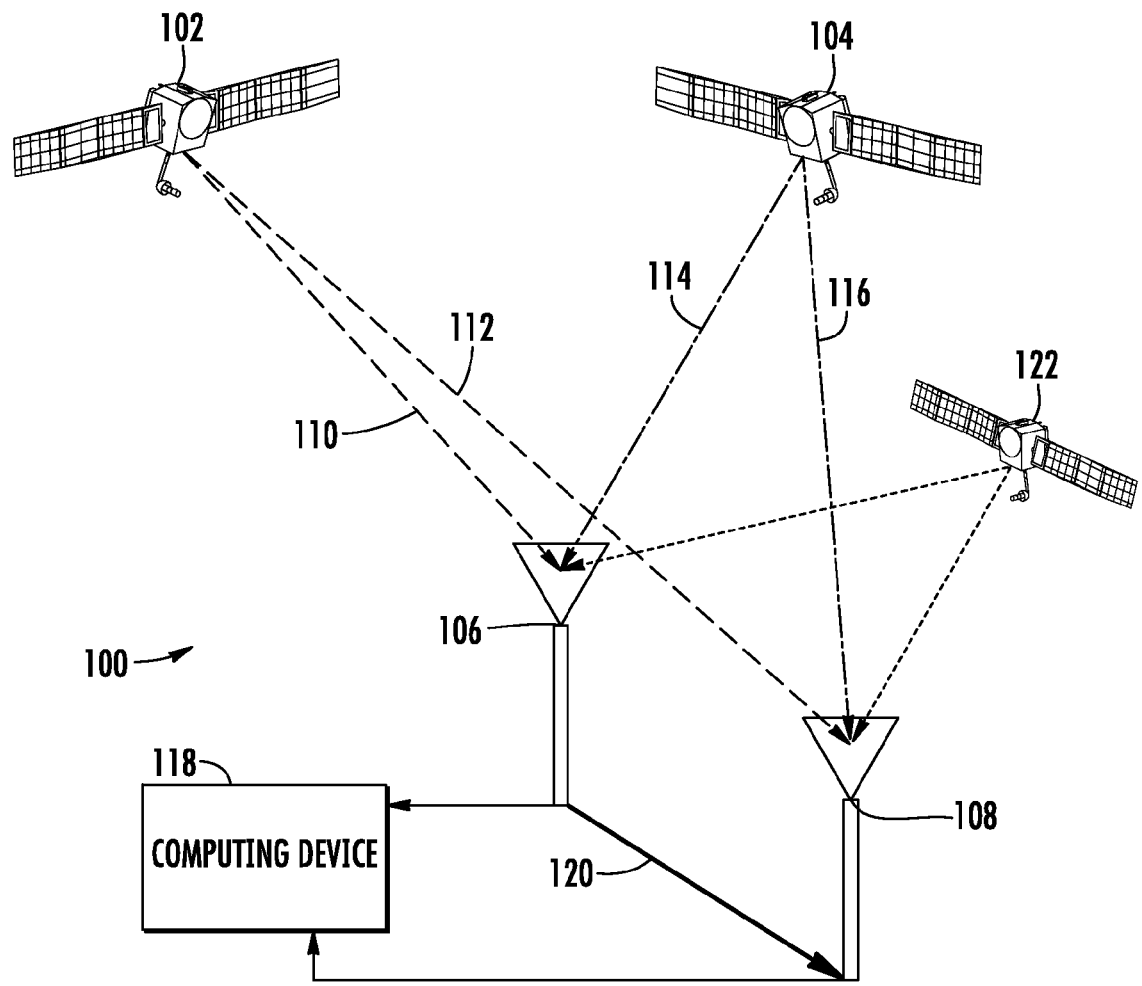
FIG. 1 depicts an exemplary system for measuring double differenced carrier phase values according to an exemplary embodiment of the present disclosure.

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment.

Generally, the present disclosure is directed to systems and methods for estimating the attitude of a device over a series of epochs. In particular, the attitude of the device at each epoch can be estimated by minimizing a cost function comparing expected double differenced carrier phase values to measured double differenced carrier phase values over a set of candidate attitudes. Each epoch can correlate to a specific instant or period of time.

Generally, the attitude of a device can refer to the orientation of the device in physical space, including, for example, the relationship between a coordinate frame defined with respect to the device and a global coordinate frame. Estimating the attitude of a device can prove useful in many situations, including real time vehicle navigation applications.

Another exemplary application of the present subject matter can be directed to assigning geographic position information to data collected by a data collection system, such as a data collection system provided in conjunction with a vehicle or device that is used to collect photographic imagery associated with the Street View™ imagery provided by Google Inc. Knowledge regarding the attitude of the vehicle or device at the time of image capture can improve the accuracy and detail of the geographic position information associated with the collected data.

In an exemplary aspect of the present subject matter, two receiver antennas associated with a device can have known locations relative to the device and a local vector between the two antennas can be expressed in the device coordinate frame. An initial candidate attitude can be obtained to provide an initial guess regarding the orientation of the device. As an example, the initial candidate attitude can be a default attitude associated with a set of logical constraints, such as, for example, requiring that the device be pointed up and moving forward.

As another example, the initial candidate attitude can be determined using an algorithm that incorporates data from a plurality of data sources in its calculation, including one or more inertial measurement units, prior GPS location estimates, logical constraints, and/or other suitable data sources. As yet another example, the attitude of the device as estimated for a previous epoch can be selected as the initial candidate attitude for the present epoch.

A plurality of expected double differenced carrier phase values can be determined based on the initial candidate attitude. As an example, using the initial candidate attitude, the local vector that connects the two antennas can be rotated from the device coordinate frame to a global coordinate frame to produce a global vector. A plurality of line of sight vectors to a plurality of satellite pairings can be determined using satellite positional data obtained from, for example, a satellite positional database.

Projecting the global vector onto each of the plurality of line of sight vectors can produce a plurality of expected double differenced measurements. For example, such expected double differenced measurement can be in units of meters. Converting each of the expected double differenced measurements to radians by dividing by the carrier signal wavelength and multiplying by $2\pi$ can provide the plurality of expected double differenced carrier phase values.

A plurality of measured double differenced carrier phase values can also be obtained. In particular, each measured double differenced carrier phase value can be measured with respect to one of the plurality of satellite pairings. Each measured double differenced carrier phase value can be constructed as the difference between the single-differenced carrier phase values of an identified satellite for each receiver. Each single-differenced carrier phase value can be constructed as the difference between a measured carrier phase value of a mutually observed satellite between the two receivers.

The plurality of expected double differenced carrier phase values can be inputted into a cost function to obtain a first cost value associated with the initial candidate attitude. In particular, the cost function can respectively compare the plurality of expected double differenced carrier phase values to the plurality of measured double differenced carrier phase values.

As an example, inputting the plurality of expected double differenced carrier phase values into the cost function can include determining a plurality of residual values by respectively differencing the plurality of expected double differenced carrier phase values from the plurality of measured double differenced carrier phase values. In particular, the expected double differenced carrier phase value determined for each satellite pairing can be differenced with the measured double differenced carrier phase value measured with respect to such satellite pairing to obtain a residual value for such pairing.

The plurality of residual values can be normalized to obtain a plurality of normalized residual values. For example, each residual value can be normalized by determining the inverse tangent of the sine of such residual value divided by the cosine of such residual value.

The plurality of normalized residual values can be inputted into a cost function to obtain a first cost value associated with the initial candidate attitude. For example, the cost function can equal a sum of each of the normalized residual values squared.

The cost function can then be minimized. As an example, the cost function can be minimized by using or otherwise implementing a global optimizer such as, for example, a non-linear iterative least squares solver. As an example, the iterative least squares solver can be the Ceres solver developed by Google Inc.

Once the cost function has been minimized or otherwise satisfactorily reduced, the final candidate attitude that resulted in the minimization of the cost function can be selected as the attitude of the device for that epoch. In such fashion, minimization of the cost function can result in an estimated device attitude of increased accuracy. Performing the method discussed above for each of the plurality of epochs can result in an estimation of the attitude of the device at each of such epochs.

Exemplary computer-implemented attitude estimation systems and methods according to exemplary embodiments of the present disclosure will now be set forth. Due to the inherent flexibility of computer-based systems, one of ordinary skill in the art, in light of the disclosures contained herein, will understand that a great variety of possible configurations, combinations, and divisions of tasks and functionality between and among the components of a computer-implemented attitude estimation system are possible. For instance, the systems and methods according to aspects of the present disclosure can be implemented using a single computing device or across multiple computing devices in a parallel or distributed computing environment.

In addition, the exemplary systems and methods of the present disclosure can be implemented in either an on-line or offline fashion. For example, the exemplary systems and methods can be implemented near real-time. As another example, the exemplary systems and methods can be implemented after batch post-processing of collected data. The estimated attitude outputted by the system can be combined with additional sensor data or other suitable data sources to refine the estimated attitude.

Furthermore, while the present disclosure is discussed with reference to the GPS satellite system, it will be understood that the systems and methods of the present disclosure can be used to determine an attitude of a device configured to receive signals from any suitable satellite constellation.

FIG. 1 depicts an exemplary system for measuring double differenced carrier phase values according to an exemplary embodiment of the present disclosure. More particularly, system 100 depicts satellites 102, 104, and 122 in communication with receiver antennas 106 and 108. For example, satellite 102 can send signal 110 to antenna 106 and signal 112 to antenna 108. Signals 110 and 112 are representative of one broadcasted signal, but are received by antennas 106 and 108 at different times. Similarly, satellite 104 can send signal 114 to antenna 106 and signal 116 to antenna 108. Signals 114 and 116 represent the same broadcasted signal, but are received by antennas 106 and 108 at different times.

Antennas 106 and 108 can respectively communicate signals 110, 112, 114, and 116 to computing device 118. Computing device 118 can comprise one or more processors, clocks, or other computing devices. Computing device 118 can measure a carrier phase value respectively associated with each of signals 110, 112, 114, and 116. Computing device 118 can use the carrier phase values to compute a first measured double differenced carrier phase value. Computing device 118 can use the first measured double differenced carrier phase value to estimate a baseline vector 120, however, to do so requires knowledge of one or more ambiguous integers.

One of skill in the art, in light of the disclosures contained herein, will understand that a double differenced carrier phase value can be computed for each available satellite pairing common to both receivers. For instance, a second measured double differenced carrier phase value can be computed using signals from satellites 102 and 122. In such fashion, the number of available double differenced carrier phase values can equal (N−1), where N is the number of satellites that are common between both receivers. This is because one of the single differenced satellite measurements is used as a reference satellite in the second differencing.

Figure 2:
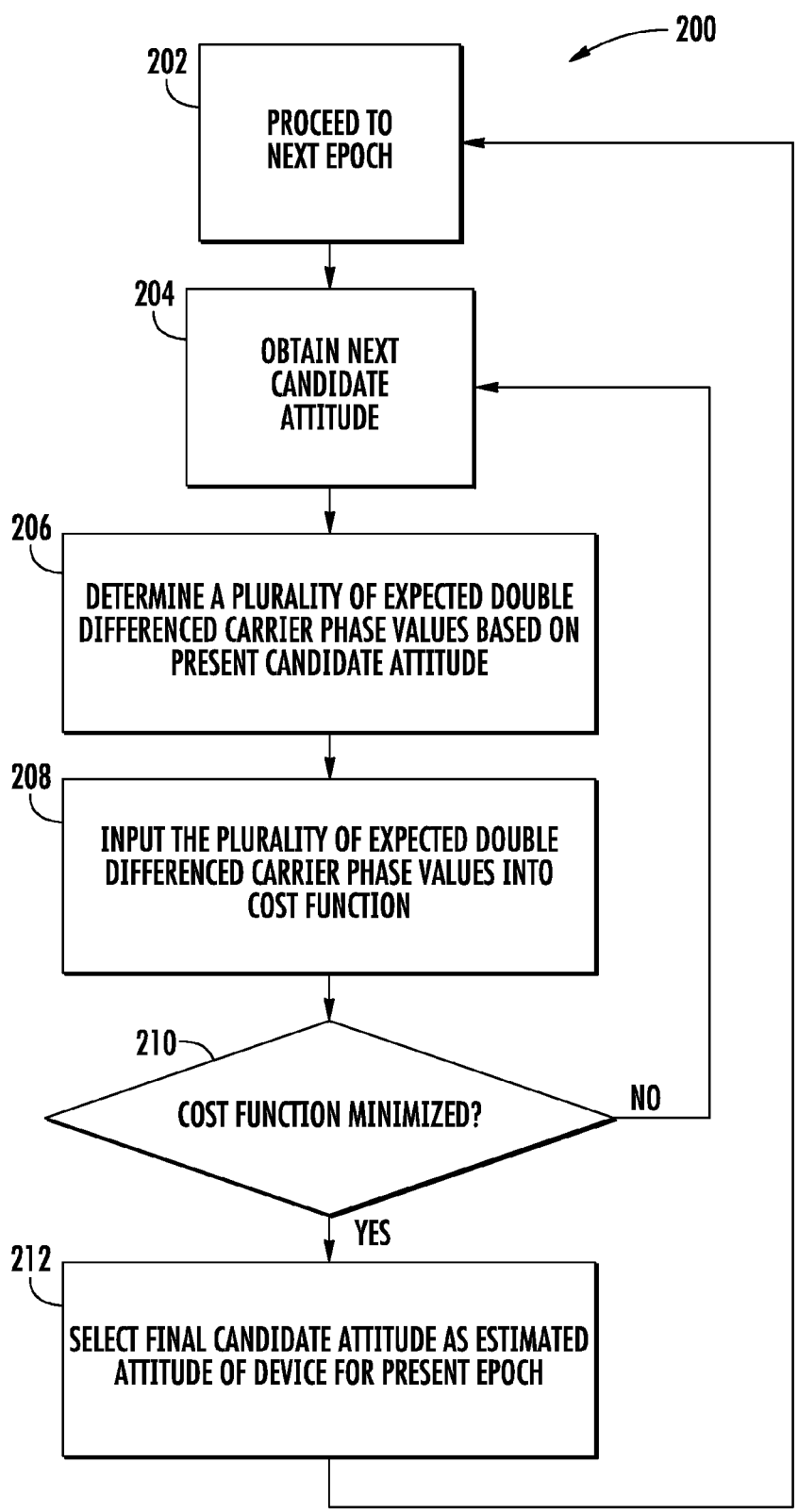
FIG. 2 depicts a flow chart of an exemplary method according to an exemplary embodiment of the present disclosure.

FIG. 2 depicts a flow chart of an exemplary method (200) for estimating an attitude of a device over a plurality of epochs according to an exemplary embodiment of the present disclosure. The exemplary method (200) can be implemented using any suitable computing system, including attitude estimation system 500 of FIG. 5.

In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (202) the method can proceed to consider data associated with the next epoch. In particular, method (200) can be performed to estimate an attitude of a device for each of a plurality of epochs. Thus, the first instance of (202) can proceed to consider data from the earliest epoch for which an attitude of the device is to be estimated.

At (204) a candidate attitude can be obtained. For example, for the first instance of (204) for each epoch, the candidate attitude obtained at (204) can be an initial candidate attitude which serves as a first, or initial guess regarding the attitude of the device at such epoch. Thereafter, for further instances of (204) within a particular epoch, the candidate attitude obtained at (204) can be a revised candidate attitude or additional guess which seeks to minimize a cost formula.

As an example, in the instance in which the candidate attitude obtained at (204) is an initial candidate attitude for a particular epoch, a default attitude associated with a set of logical constraints, such as, for example, requiring that the device be pointed up and moving forward can be obtained. As another example, the candidate attitude obtained at (204) can be determined using an algorithm that incorporates data from a plurality of data sources in its calculation, including one or more inertial measurement units, prior GPS location estimates, logical constraints, and/or other suitable data sources. As yet another example, the attitude of the device as estimated for a previous epoch can be obtained at (204) and employed as the initial candidate attitude for the present epoch.

At (206) a plurality of expected double differenced carrier phase values can be determined based on the candidate attitude most recently obtained at (204). As an example, particular exemplary methods for determining a plurality of expected double differenced carrier phase values based on a candidate attitude will be discussed further with reference to FIGS. 3A and 3B. However, any suitable method for determining expected double differenced carrier phase values based on a candidate attitude can be employed at (206).

At (208) the plurality of expected double differenced carrier phase values determined at (206) can be inputted into a cost function. In particular, the cost function can be the sum of each of a plurality of residual functions squared. Each residual function can equal one of the plurality of expected double differenced carrier phase values differenced with a corresponding one of a plurality of measured double differenced carrier phase values. Thus, a cost value output by the cost function can provide an indication of the degree to which expected double differenced carrier phase values associated with the present candidate attitude match the actual measured double differenced carrier phase values observed by the device.

At (210) it can be determined whether the cost function has been sufficiently minimized. As an example, particular exemplary methods for minimizing the cost function will be discussed further with reference to FIGS. 3A and 3B. However, any suitable method for minimizing or otherwise sufficiently reducing the cost function can be used by the system and methods of the present disclosure.

Thus, at (210) it can be determined whether the cost function has been sufficiently minimized. For example, it can be determined whether the cost function has been reduced to below a threshold value. As another example, it can be determined whether a threshold number of iterations have been performed.

If it is determined at (210) that the cost function has not been sufficiently minimized, then method (200) can return to (204) and obtain the next candidate value. For example, the next candidate value can be a revised candidate value selected in light of one or more derivative values associated with the cost function or its residual function components. As another example, the next candidate value can be selected by an iterative least squares solver.

However, if it is determined at (210) that the cost function has been sufficiently minimized, then at (212) the final candidate attitude that resulted in such minimization can be selected as the estimated attitude of the device for the present epoch. In particular, the candidate attitude that was most recently obtained at (204) can be the final candidate attitude and can be selected as the attitude of the device for the present epoch.

After (212), method (200) can return to (202) and proceed to or otherwise consider data associated with the next epoch. In such fashion, steps (204)-(212) can be iteratively repeated for each epoch, such that an attitude of the device is estimated for each epoch.

Figure 3A:
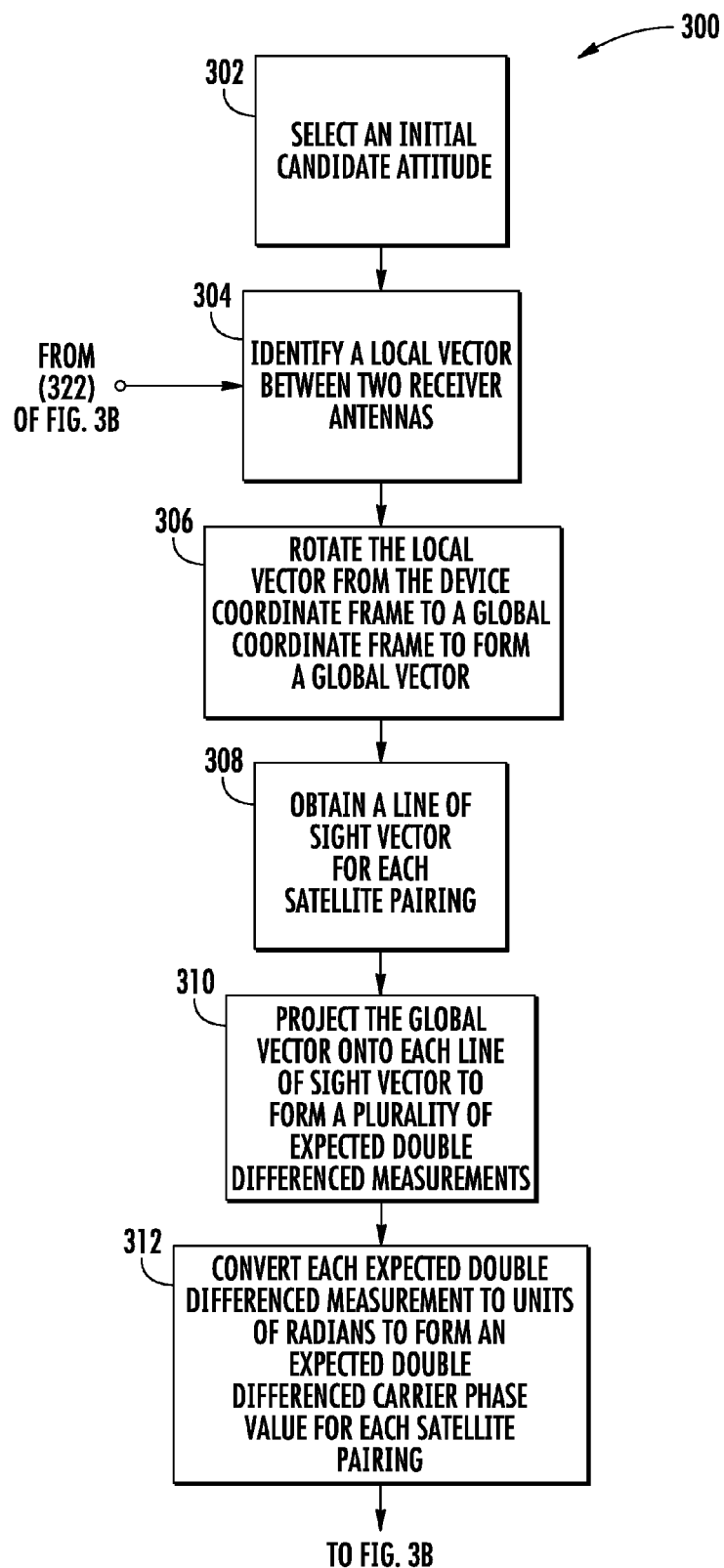
FIGS. 3A and 3B depict a flow chart of an exemplary computer-implemented method according to an exemplary embodiment of the present disclosure.
Figure 3B:
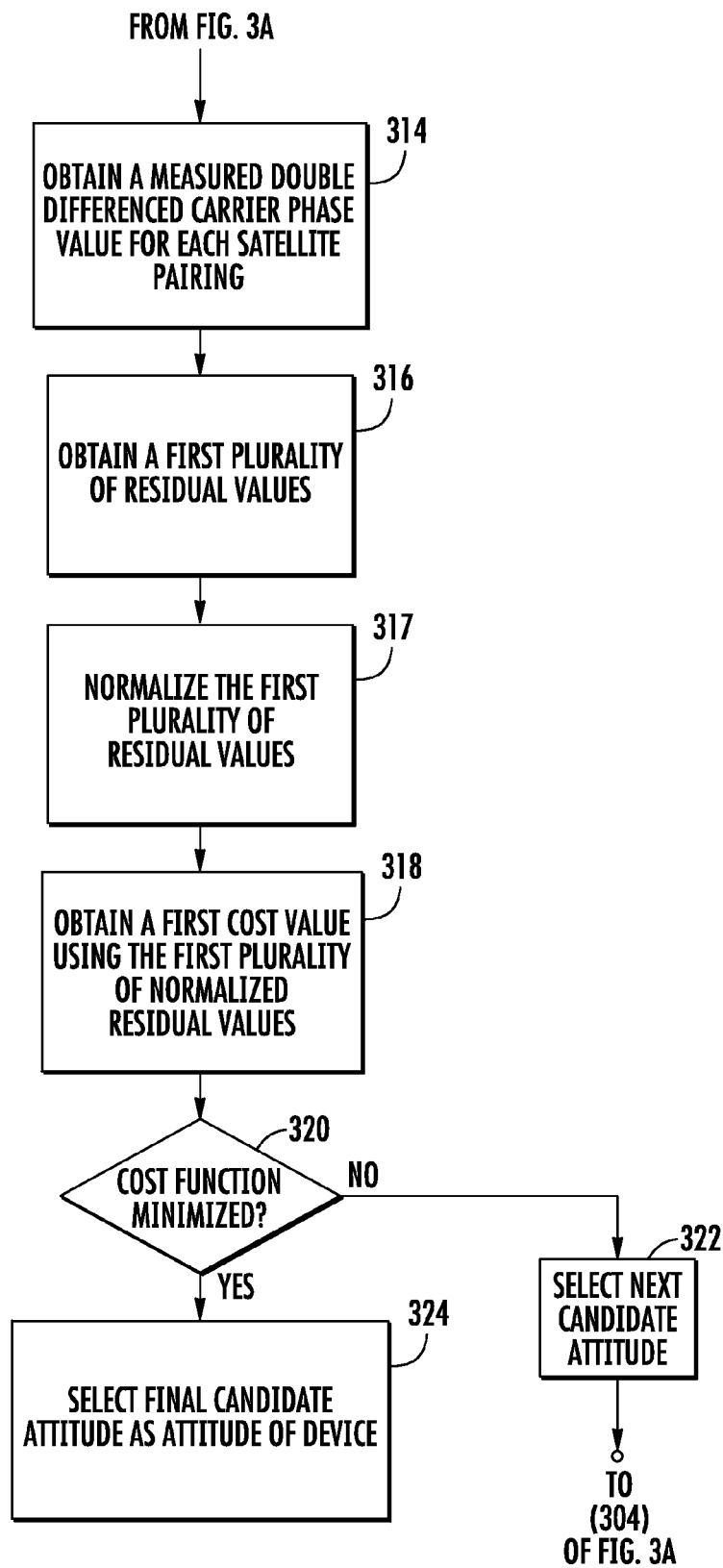

FIGS. 3A and 3B depict a flow chart of an exemplary method (300) for estimating attitude using double differenced carrier phase measurements according to an exemplary embodiment of the present disclosure. The exemplary method (300) can be implemented using any suitable computing system, including attitude estimation system 500 of FIG. 5.

In addition, although FIGS. 3A and 3B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Further, it will be understood that exemplary method (300) can be performed for each of a plurality of sequential epochs.

Figure 4:
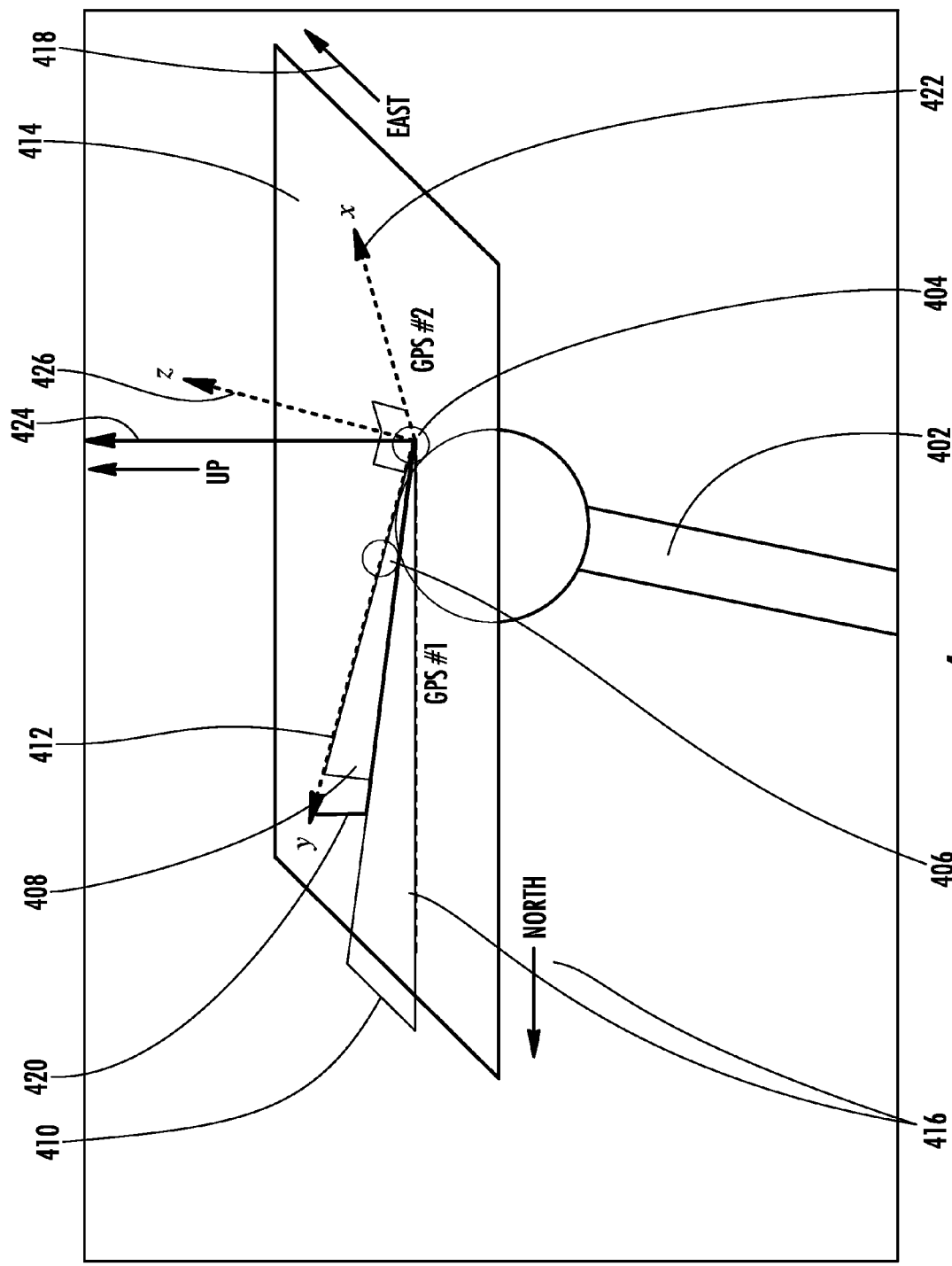
FIG. 4 illustrates a representation of coordinate frames associated with an exemplary data collection device according to an exemplary embodiment of the present disclosure.

Referring to FIG. 3A, at (302) an initial candidate attitude can be selected. An exemplary candidate attitude can be more readily appreciated with reference to FIG. 4 which illustrates a representation of coordinate frames associated with an exemplary data collection device 402 according to an exemplary embodiment of the present disclosure. More particularly, FIG. 4 illustrates an exemplary data collection device 402 and associated receiver antennas 404 and 406. Receiver antennas 404 and 406 have known locations within the device coordinate frame defined by x-axis 422, y-axis 412, and z-axis 426. Together, receiver antennas 404 and 406 have an attitude. In some implementations, the attitude can be defined with respect to the global coordinate frame defined by east-axis 418, north-axis 416, and up-axis 424.

The candidate attitude of receiver antennas 404 and 406 can comprise one or more components. For example, the candidate attitude can include an estimate of a pitch angle 408 and an estimate of a yaw angle 410 associated with receiver antennas 404 and 406. As another example, the initial candidate attitude of receiver antennas 404 and 406 can include an estimate of a separation distance between receiver antenna 404 and receiver antenna 406.

In some implementations, the estimate of the separation distance can be an estimate of the separation distance between the respective phase centers of receiver antennas 404 and 406. For example, receiver antennas 404 and 406 can have different phase centers associated with each satellite, such that candidate phase center locations are a component of each candidate attitude that varies with respect to the plurality of satellite pairings.

Returning to FIG. 3A at (302), the initial candidate attitude can be selected in various fashions. In one implementation, an algorithm that incorporates data from a plurality of data sources can be used to select the initial candidate attitude. For instance, an attitude estimation system can implement an algorithm that selects an initial candidate attitude based upon data generated by one or more inertial measurement units, prior GPS location estimations based upon data received by receiver antennas, logical constraints, and/or other suitable data. For example, the proposed candidate attitude can be selected if it satisfies a set of logical constraints.

Exemplary logical constraints include: requiring that the pitch angle value be within a given range; requiring that the yaw angle value be within a given range; requiring that the zenith angle value be within a given range, wherein the zenith angle is the angle defined between the z-axis of the device coordinate frame and the up-axis of the global coordinate frame; requiring that the magnitude of the difference between the yaw angle value of the initial candidate attitude and the yaw angle value of a previous final candidate attitude of a previous epoch be less than a given maximum value; or other suitable logical constraints. Logical constraints can be stored in memory.

The initial candidate attitude can also be selected by obtaining a prior estimate of attitude. For instance, exemplary method (300) can be used to estimate the attitude of a device for each of a plurality of sequential epochs. The initial candidate attitude selected at (302) can be the estimated attitude of the device at the prior epoch as estimated by exemplary method (300). As another example, the initial candidate attitude selected at (302) can be a running average of the estimated attitudes of the device over a given number of prior epochs. As yet another example, the initial candidate attitude can be selected based upon an average of data obtained from the current epoch and prior estimates of attitude.

The initial candidate attitude can also be selected by obtaining a default candidate attitude. For example, the default candidate attitude can have yaw and zenith angle values of zero. As another example, the default candidate attitude can have a zenith angle value of zero and a yaw angle value equal to the yaw angle value of the previous estimate of attitude.

At (304) a local vector between the two receiver antennas can be identified. The local vector can express the relative position of one antenna with respect to the other within the device coordinate frame. In one implementation, the local vector is constant throughout exemplary method (300). For instance, referring to FIG. 4, the local vector can have a y-axis value corresponding to the physical distance from receiver antenna 404 to receiver antenna 406. In another implementation, the local vector can be different for each satellite pairing and candidate attitude. For instance, the local vector can vary based upon candidate phase centers associated with each satellite pairing.

Returning to FIG. 3A, at (306) the local vector can be rotated from the local coordinate frame to the global coordinate frame to form a global vector. The local vector can be rotated according to a rotation matrix. The rotation matrix can be formed based upon the candidate attitude. Rotating the local vector from the device coordinate frame to the global coordinate frame can include rotating the local vector from the device coordinate frame to the global coordinate frame based upon a plurality of rotation matrices.

At (308), a line of sight vector can be obtained for each satellite pairing. For example, the line of sight vector can be a vector associated with the line of sight to each non-reference satellite used to obtain a measured double differenced carrier phase value for each satellite pairing at (314) of FIG. 3B. In one implementation, the line of sight vectors can be determined using data obtained from a satellite positional database. For example, an attitude estimation system can access satellite positional data from a satellite positional database over a network and determine line of sight vectors based in part upon the satellite positional data. The satellite positional database can be a database maintained by the United States Government that is accessible over the Internet. Alternatively, the satellite positional database can be a portion of system memory that stores satellite positional information received by receiver antennas, including satellite ephemeris information broadcasted by the satellites. Such satellite ephemeris information can be used in a real-time application of method (300).

Returning to FIG. 3A, at (310) the global vector can be projected onto each line of sight vector to form a plurality of expected double differenced measurements. For example, such expected double differenced measurements can be in units of meters.

At (312) the expected double differenced measurements can be converted to units of radians to form a plurality of expected double differenced carrier phase values. For example, each expected double differenced measurement can be divided by the carrier signal wavelength and multiplied by $2\pi$ to convert the expected double differenced measurement to units of radians.

Referring now to FIG. 3B, at (314) a measured double differenced carrier phase value can be obtained for each satellite, except the selected reference satellite. For example, each of the (N−1) satellite pairings can use a single satellite as the reference satellite. One of skill in the art, in light of the disclosures contained herein, will understand that various combinations of operations can be used to calculate a measured double differenced carrier phase value.

At (316) a first plurality of residual values can be obtained. The first plurality of residual values can be the result of subtracting each satellite pairing's expected double differenced carrier phase value formed at (312) from each satellite pairing's measured double differenced carrier phase value obtained at (314).

At (317) the first plurality of residual values can be normalized. As an example, normalizing the first plurality of residual values can include dividing the sine of each of the residual values by the cosine of each of the residual values to obtain a plurality of second residual values. Normalizing at (317) can further include taking the inverse tangent of each of the plurality of second residual values to obtain a plurality of normalized residual values. Such normalization can implicitly estimate the integer ambiguity and removes its contribution.

At (318) a first cost value can be obtained by inputting the plurality of normalized residual values into a cost function. For example, the cost function can be a sum of the squares of the normalized residual values. As another example, the cost function can be a weighted sum of the squares or a nonlinear combination or some other arbitrary function.

Thus, the cost function can be the sum of each of a plurality of residual functions squared. For example, each residual function can correspond to one of the satellite pairings and can comprise the expected double differenced carrier phase function associated with that satellite pairing subtracted from the measured double differenced carrier phase value obtained from that satellite pairing. The plurality of residual functions can further be normalized in the fashion discussed at (317). The cost function can be a sum of the squares of each normalized residual function or other suitable cost function. Calculating the cost function using the first plurality of normalized residual values can produce a first cost value.

At (320) the cost function can be minimized or otherwise reduced. As an example, the cost function can be iteratively minimized or otherwise reduced until a final cost value is obtained which is below a given threshold value. If it is determined at (320) that the cost function has not been sufficiently reduced, then at (322) the next candidate attitude is selected. Generally, the next candidate attitude can result in a cost value that is less than the previous cost value associated with the previous candidate attitude.

As an example, a global optimizer can be implemented to minimize or otherwise reduce the cost function. For example, the global optimizer can be an iterative least squares solver which converges upon a final candidate attitude that minimizes the total cost function. As another example, the global optimizer can be the Ceres Solver developed by Google Inc.

As another example, a derivative of the cost function with respect to the variable components of the candidate attitude can be evaluated at the candidate values associated with the candidate attitude for each residual function. For example, a Jacobian matrix can be formed describing the partial derivatives of each residual function contained within the cost function. The next candidate attitude can be selected based upon the derivative values, wherein the next candidate attitude has a cost value associated therewith that is lesser than the first cost value.

As yet another example, a global optimizer can reduce the cost function by implementing exemplary method (300) over a set number of iterations. For example, a global optimizer can be instructed to reduce a cost function by sequentially selecting a plurality of candidate attitudes. Each subsequent candidate attitude can have a cost value associated therewith and the associated cost value can be less than the cost value associated with the previous candidate attitude. After a predetermined number of iterations, the most recently selected candidate attitude can be selected as the attitude of the device.

If it is determined at (320) that the cost function has been sufficiently reduced, then at (324) the final candidate attitude which minimizes or otherwise reduces the function can then be selected as an estimated attitude for the device. As an example, the estimated attitude can be the candidate attitude most recently selected at (322). The final candidate attitude selected at (324) can be a more accurate estimate of the attitude of the device or antenna configuration than the initial candidate attitude.

Figure 5:
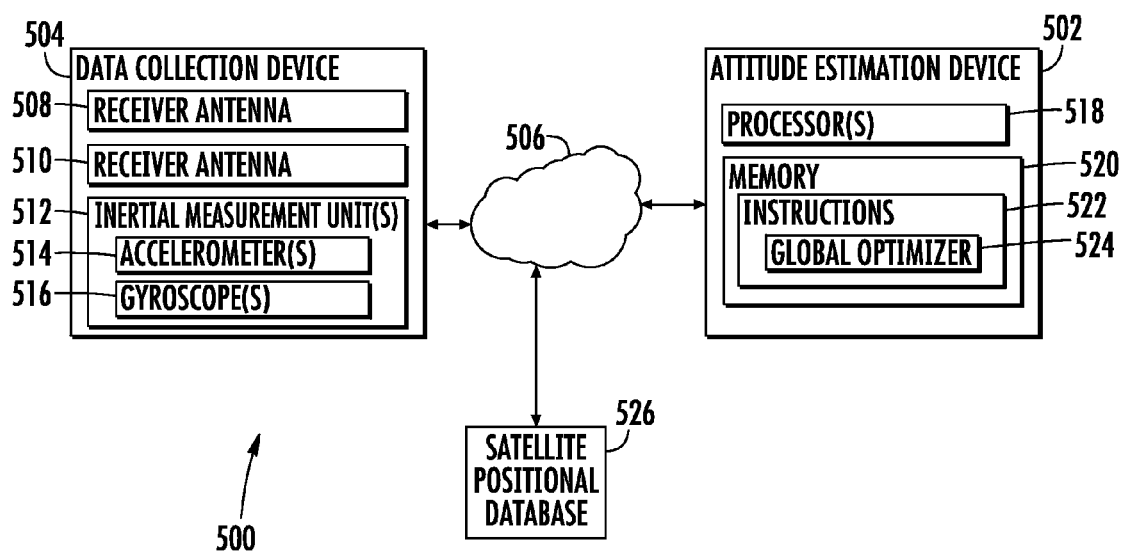
FIG. 5 depicts an exemplary attitude estimation system according to an exemplary embodiment of the present disclosure.

FIG. 5 depicts an exemplary attitude estimation system 500 according to an exemplary embodiment of the present disclosure. Attitude estimation system 500 can implement the exemplary methods (200) and/or (300). In particular, attitude estimation device 502 can receive collected data from data collection device 504 over network 506. Network 506 can be a LAN, WAN, or other suitable network and can include any number of wired or wireless link.

Data collection device 504 can include receiver antenna 508, receiver antenna 510, and one or more inertial measurement units 512. Inertial measurement unit 512 can include one or more accelerometers 514 and one or more gyroscopes 516. Data collection device 504 can further include any number of data capture components such as, for example, one or more cameras, a laser scanner, or other components.

Attitude estimation device 502 can include processor 518 and memory 520. Processor 518 can be one processor or can be a plurality of processors that are operably connected. Memory 520 can store instructions 522 which cause the processor to perform operations. For instance, the memory 520 can store instructions 522 to implement one or more modules. Such modules can include global optimizer module 524 to minimize or otherwise reduce a cost function. Memory 114 can also include or be in communication with one or more databases.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

According to one aspect, attitude estimation device 502 can select an initial candidate attitude based in part upon data received from data collection device 504 over network 506. For instance, processor 518 can implement an algorithm that selects an initial candidate attitude based upon data generated by inertial measurement unit 512, prior GPS location estimations based upon data received by receiver antennas 508 and 510, logical constraints, and/or other suitable data. For example, an initial candidate attitude can be proposed based upon a weighted average of data generated from accelerometer 514, data generated from gyroscope 516, and heading data generated from prior GPS location estimates. The proposed candidate attitude can be selected if it satisfies a set of logical constraints.

Attitude estimation device 502 can also access satellite positional data from satellite positional database 526 over network 506. Attitude estimation device 502 can determine line of sight vectors based in part upon the satellite positional data. Satellite positional database 526 can be a database maintained by the United States Government that is accessible over the internet. Alternatively, satellite positional database 526 can be a portion of memory 520 that stores satellite positional information received by receiver antennas 508 and 510.

Attitude estimation system 500 can also calculate a plurality of double differenced carrier phase values associated with a plurality of satellite pairings. For example, processor 518 of attitude estimation device 502 can calculate measured double differenced carrier phase values from signals received by receiver antennas 508 and 510 of data collection device 504.

Attitude estimation system 500 can also minimize or otherwise reduce a cost function. For example, processor 518 of attitude estimation device 502 can implement global optimizer module 524 to reduce a cost function. Processor 518 can also extract an estimated attitude which minimizes or otherwise reduces cost function.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for estimating an attitude of a device, the method comprising:
   obtaining, by one or more computing devices, an initial candidate attitude;
   determining, by the one or more computing devices, a plurality of expected double differenced carrier phase values based on the initial candidate attitude;
   inputting, by the one or more computing devices, the plurality of expected double differenced carrier phase values into a cost function, wherein the cost function respectively compares the plurality of expected double differenced carrier phase values to a plurality of measured double differenced carrier phase values;
   minimizing, by the one or more computing devices, the cost function; and
   selecting, by the one or more computing devices, a final candidate attitude associated with the minimized cost function as the attitude of the device.

2. The computer-implemented method of claim 1, wherein obtaining, by the one or more computing devices, the initial candidate attitude comprises obtaining, by the one or more computing devices, an estimated attitude, the estimated attitude having been previously determined based at least in part on data from one or more inertial measurement units.

3. The computer-implemented method of claim 1, wherein obtaining, by the one or more computing devices, the initial candidate attitude comprises obtaining, by the one or more computing devices, a default candidate attitude, wherein the default candidate attitude complies with one or more logical constraints associated with the device.

4. The computer-implemented method of claim 1, wherein obtaining, by the one or more computing devices, the initial candidate attitude comprises obtaining, by the one or more computing devices, a previous final candidate attitude associated with a previous epoch.

5. The computer-implemented method of claim 1, wherein:
   the device comprises a first receiver antenna and a second receiver antenna; and
   the initial candidate attitude comprises an initial candidate pitch angle and an initial candidate yaw angle associated with the first and second receiver antennas.

6. The computer-implemented method of claim 5, wherein the initial candidate attitude further comprises an estimated separation distance between respective phase centers of the first and second receiver antennas.

7. The computer-implemented method of claim 1, wherein determining, by the one or more computing devices, the plurality of expected double differenced carrier phase values based on the initial candidate attitude comprises:
   determining, by the one or more computing devices, a local vector between a first and second receiver antenna of the device;
   rotating, by the one or more computing devices, the local vector from a device coordinate frame to a global coordinate frame such that a global vector is obtained;
   determining, by the one or more computing devices, a plurality of line of sight vectors respectively associated with a plurality of satellite pairings;
   respectively projecting, by the one or more computing devices, the global vector onto the plurality of line of sight vectors to obtain a plurality of expected double differenced measurements; and
   respectively converting, by the one or more computing devices, the plurality of expected double differenced measurements to units of radians to obtain the plurality of expected double differenced carrier phase values.

8. The computer-implemented method of claim 7, wherein:
   each of the plurality of satellite pairings comprises a reference satellite and a non-reference satellite;
   the reference satellite comprises a single satellite for all of the plurality of satellite pairings; and
   the line of sight vector associated with each satellite pairing describes a line of sight from the device to the non-reference satellite of such satellite pairing.

9. The computer-implemented method of claim 1, wherein inputting, by the one or more computing devices, the plurality of expected double differenced carrier phase values into the cost function comprises:
   respectively differencing, by the one or more computing devices, the plurality of expected double differenced carrier phase values with the plurality of measured double differenced carrier phase values to obtain a plurality of residual values;
   normalizing, by the one or more computing devices, the plurality of residual values to obtain a plurality of normalized residual values; and
   inputting, by the one or more computing devices, the plurality of normalized residual values into the cost function, wherein the cost function comprises a sum of each of the plurality of normalized residual values squared.

10. The computer-implemented method of claim 9, wherein normalizing, by the one or more computing devices, the plurality of residual values comprises determining, by the one or more computing devices for each of the plurality of residual values, the inverse tangent of the sine of the residual value divided by the cosine of the residual value.

11. The computer-implemented method of claim 1, wherein the cost function comprises a sum of each of a plurality of residual functions squared, and wherein each residual function comprises a difference between one of the plurality of expected double differenced carrier phase values and one of the plurality of measured double differenced carrier phase values.

12. The computer-implemented method of claim 1, wherein minimizing, by the one or more computing devices, the cost function comprises minimizing, by the one or more computing devices, the cost function using an iterative least squares solver.

13. The computer-implemented method of claim 1, further comprising repeating, by the one or more computing devices for each of a plurality of epochs, the steps of obtaining an initial candidate attitude, determining a plurality of expected double differenced carrier phase values, inputting the plurality of expected double differenced carrier phase values into a cost function, minimizing the cost function, and selecting a final candidate attitude.

14. The computer-implemented method of claim 1, further comprising associating, by the one or more computing devices, the attitude of the device with one or more images that were captured by the device at approximately the same time as the device received a plurality of satellite signals associated with the plurality of measured double differenced carrier phase values.

* * * * *